No. 701,835. Patented June 10, 1902.
G. A. BRONDER.
CONVEYER.
(Application filed May 3, 1901.)
(No Model.) 2 Sheets—Sheet 2.
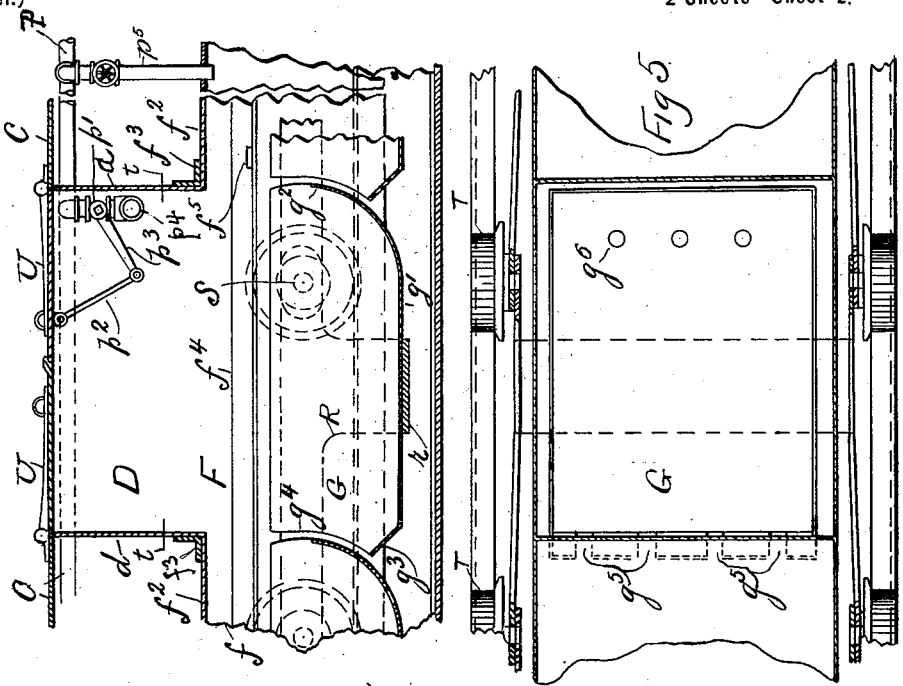
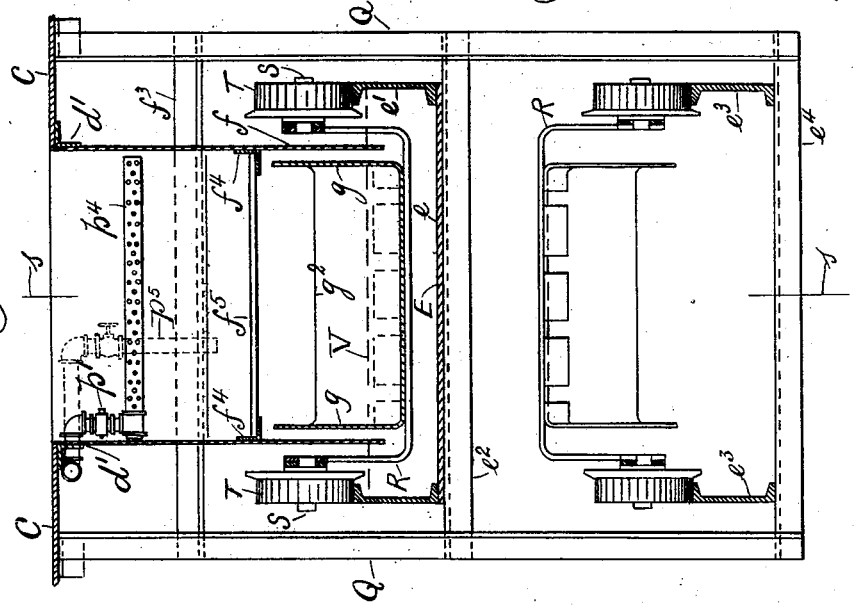
Witnesses
Charles J. Gefvert
William P. Franel
Inventor
Gaston A. Bronder
By his Attorney
A. A. de Bonneville

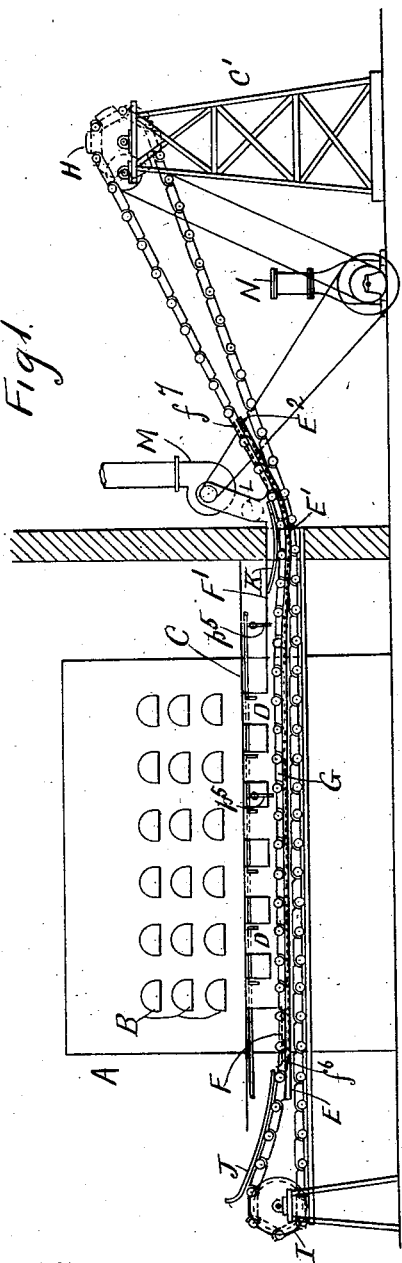
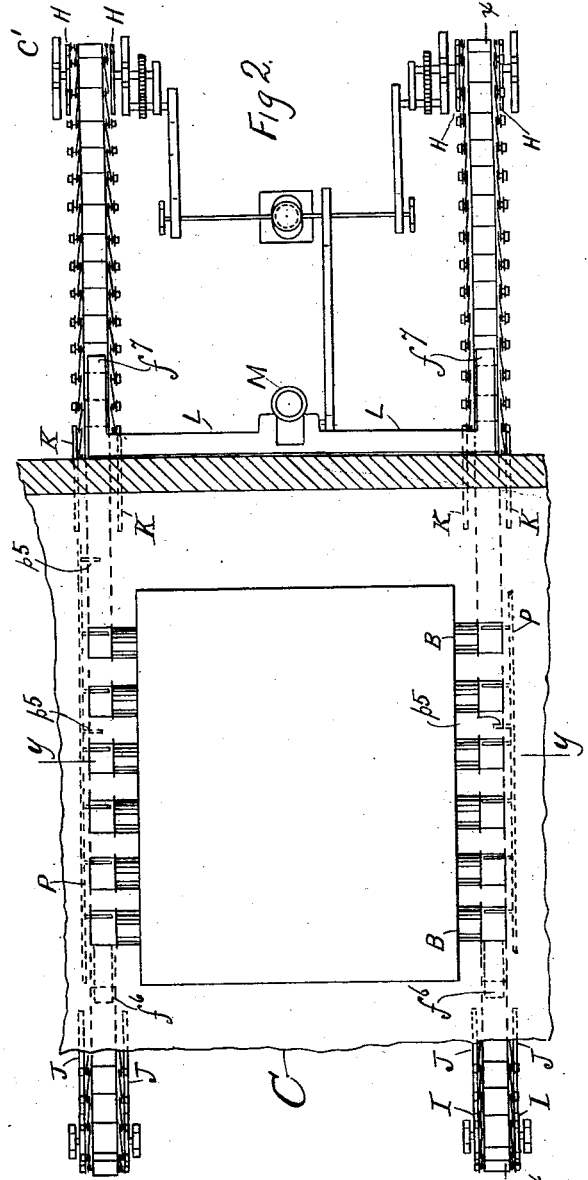

UNITED STATES PATENT OFFICE.

GASTON A. BRONDER, OF BROOKLYN, NEW YORK.

CONVEYER.

SPECIFICATION forming part of Letters Patent No. 701,835, dated June 10, 1902.

Application filed May 3, 1901. Serial No. 58,644. (No model.)

*To all whom it may concern:*

Be it known that I, GASTON A. BRONDER, a citizen of the United States, and a resident of the borough of Brooklyn, in the county of Kings and State of New York, have invented certain new and useful Improvements in Conveyers, of which the following is a specification.

This invention relates to conveyers operating in water-sealed conduits. Its object is the production of conveyers which will carry their charges in water-sealed conduits and discharge the dust, smoke, vapor, or other gases of the charges to predetermined points. To obtain these ends, the conveyers are propelled through conduits partially filled with water, the upper portion of the said conduits being connected with suction apparatus to expel the dust, smoke, or other gases.

Figure 1 represents an elevation of my invention with a partial section on the line $xx$ of Fig. 2. Fig. 2 shows a plan view of the apparatus. Fig. 3 is a section of the conduit with the conveyer on the line $yy$ of Fig. 2. Fig. 4 represents a section of the upper portion of Fig. 3 on the line $ss$. Fig. 5 shows a section on the line $tt$ of Fig. 4.

Referring to Figs. 1 and 2, a retort stack-house is shown at A with the mouthpieces B. A floor C constitutes a platform extending beyond the walls of the stack-house, and chutes D, arranged below the level of said floor, lead to conduits consisting of the troughs E $E^2$, over which are supported the flues F F'. The sides of the said troughs constitute tracks for the wheels of conveyers with the buckets G. The conveyers are driven by the sprocket drive-wheels H and are returned by idler-wheels I. Guides J are placed near the idler-wheels for guiding the conveyers from the idlers into the said conduits, and the guides K are placed near the ends $E^2$ of the troughs E $E^2$ and directly over a depression E' in each trough to depress the conveyer-buckets below the level of the horizontal runs of the conveyers to effectively submerge the contents of the conveyers. The conduits are connected with pipes L, which lead to an exhaust-blower M. An engine N drives the blower M and the sprocket drive-chain wheels H. Lines of piping P run under the floor C, with offsets for directing streams of water into the conveyers and troughs.

Referring to Figs. 3 to 5, the troughs E $E^2$ are represented to consist of the bottom plate $e$, with sides $e'$, the said sides also constituting the runway-tracks for the running-gear or wheels T of the conveyer. The troughs are supported on angle-irons $e^2$, secured to hangers or stanchions Q, extending from and below the floor C.

At the lower portion of Fig. 3 is shown a bucket in its inverted position on its runway-tracks $e^3$, supported on the angle $e^4$, fastened to the hangers or stanchions Q.

The flues F F' consist of the sides $f$, with covers $f^2$, and are secured by the angles $f^3$, supported on the hangers or stanchions Q. Angles $f^4$ are fastened to the sides $f$ for the purpose of preventing material dropping between the sides $g$ of the conveyer and the sides $f$ of the flue. Cross-braces $f^5$ span the flues at intervals to scrape off and level any overcharge in the conveyers, thereby preventing the choking of the flues.

The chutes D are composed of the ends $d$, with sides formed by extending the sides $f$ of the flues, and angles $d'$ secure the chutes to the floor C.

Each conveyer consists of the buckets G, with the sides $g$ and bottoms $g'$ extending up to form the fronts $g^2$ and turned up at $g^3$ to form the rear ends. Holes are located at $g^6$, and the rear ends contain openings $g^5$. The buckets are supported on the combined links and supporting-frames R, which are riveted to the buckets at $r$. The links R carry axles S, on which the conveyer-bucket wheels T turn. The front ends $g^2$ of the buckets are formed with curves drawn from the axles as centers, and the rear ends $g^4$ of the sides are formed with similar curves.

The piping under the floor C consists, essentially, of the main runs P, with perforated outlet-pipes $p^4$ and valves $p'$ fitted between the main run and the said perforated pipes. Over the chutes D are hinged the swinging covers U, from which swing the links $p^2$, which are connected to the arms $p^3$, extending from the valves $p'$, by virtue of which the valves are actuated by the opening and closing of the covers U. Secondary outlet-pipes $p^5$, with valves, (see Figs. 1 and 2,) extend from the main runs of piping P.

To operate the apparatus, the covers U are opened to allow the hot coke or other material to be discharged from the mouthpieces B and fall into the buckets G of the conveyer, and with the same operation the valves are opened, thereby spraying and quenching the charge with water as it falls through the chutes. The trough is previously filled with water to a level indicated by the line V, which is above the lower edges of the sides $f$ of the flue, thereby sealing the lower sides of the said flue and preventing any dust, smoke, vapor, or other gases escaping from the same, excepting by way of the blower apparatus, which also creates a suction inwardly in the chutes and prevents any dust, smoke, gases, or vapor rising above the said chutes. Should the material be insufficiently sprayed by the outlet-pipes $p^4$, the secondary outlet-pipes $p^5$ are provided to thoroughly quench the same. The top wall of the flue at $f^6$ (see Figs. 1 and 2) is depressed to approach the top of the ends $g^2$ of the buckets and is located between the sides of the said buckets, and the end $f^7$ is similarly situated. The trough E E² is closed at the end E and elevated at the end E² to prevent the escape of the water contained therein. The effect of the water is to precipitate any dust and allow it to be carried away by the conveyer, and the exhaust blowing apparatus carries away the gas and smoke. The holes $g^6$ and openings $g^5$ in the buckets allow the water contained in the trough E E² to enter the said buckets.

Having described my invention, I desire to secure by United States Letters Patent and claim—

1. A conveyer, a liquid-sealed flue, over and between the body of the conveyer and its running-gear, all in combination with means for propelling the conveyer in the said flue.

2. A conveyer, wheels journaled to the conveyer, a flue with its side walls extending between the body or buckets of the conveyer and the wheels thereof, all in combination with means for propelling the conveyer in the said flue.

3. The combination of a conveyer, wheels journaled to the conveyer, a trough below the conveyer, a flue extending from above the conveyer and between the body of the conveyer and the wheels thereof, and means for propelling the conveyer.

4. A conveyer, wheels carrying the conveyer, a flue with its side walls extending between the body or buckets of the conveyer and the wheels of the conveyer, in combination with an exhausting apparatus, and means to propel the conveyer.

5. A conveyer, wheels journaled to the conveyer, a liquid-sealed flue interposed between the body of the conveyer and the wheels thereof, in combination with an exhausting apparatus connected to the flue, and means for propelling the conveyer in the flue.

6. The combination of a conveyer, a trough below the conveyer, a flue covering the body of the conveyer, wheels of the conveyer located outside of the flue and the trough, and means for propelling the conveyer.

7. A coke-conveyer, a water-trough under and submerging the conveyer, a sealing-flue incasing the body of the conveyer and projecting into the said water-trough, chutes leading into the flue, means for spraying and quenching hot coke in its descent through the chutes, additional means for spraying and quenching the coke in its passage through the flue, means for preventing the coke choking up the flue, all in combination with an exhausting apparatus connected with said flue.

8. The combination of a water-trough, a sealing-flue projecting into the trough, a conveyer with its body inclosed by the said flue and trough, and wheels of the conveyer located outside of the flue and trough, and means for propelling the conveyer through the said flue and trough.

9. The combination of a conveyer, a trough below the conveyer, a flue inclosing the body of the conveyer, running-gear connected to conveyer outside of said flue, chutes leading into the flue, water-outlet pipes in the chutes, and means for propelling the conveyer through the trough and flue.

10. The combination of a conveyer, a trough below the conveyer, a flue over the conveyer, chutes leading into the flue, covers on the chutes, water-outlet pipes in the chutes, valves fitted in the said pipes, means to operate the valves by the opening and closing of the covers, and means to drive the conveyer through the said trough and flue.

11. The combination of a conveyer, a trough below the conveyer and extending above the bottom of the conveyer, a flue covering the conveyer and projecting into the trough, chutes leading into the flue, outlet water-pipes in the chutes, a main water-supply pipe connecting the said outlets, covers swinging on the top of chutes, valves in the outlet-pipes, links connecting the covers and the said valves, and means to drive the conveyer.

12. The combination of a conveyer, a trough below the conveyer and projecting above the bottom of the conveyer, a flue covering the body of the conveyer and projecting into the trough, projecting pieces extending from the sides of the flue on the inside and extending inwardly beyond the sides of the conveyer, chutes leading into the flue and means for driving the conveyer.

13. The combination of a conveyer, a trough below the conveyer, a flue covering the body of the conveyer and projecting into the trough, projecting pieces extending from the sides of the flue on the inside, cross-braces connecting the inside faces of the flue above the conveyer, chutes leading into the flue, and means for driving the conveyer.

14. The combination of a bucket conveyer, a trough with a depression and elevated end, a flue over the buckets of the conveyer and extending into the trough, ends projecting from the flue and extending below and between the sides of the conveyer-buckets and the running-gear wheels journaled to the conveyer outside of the said flue, and means for driving the conveyer.

15. A conveyer, wheels carrying the conveyer, a trough secured below the conveyer, a flue fixed above the conveyer and projecting into the trough, between the body or buckets of the conveyer and the wheels thereof, in combination with an exhaust apparatus connected to the flue, and means for driving the conveyer.

16. The combination of a bucket conveyer, openings in the body of the bucket, combined frames and links carrying the buckets, wheels journaled to the frames, a trough secured below the buckets of the conveyer, the wheels of conveyer rolling on the top faces of the sides of the trough, a flue above the conveyer and extending into the trough, chutes leading into the flue, an exhaust-blower connected to the flue, means for driving the blower, covers on the chutes, spray-pipes in the chutes, valves fitted to said pipes, a main supply-pipe connecting the spray-pipes, covers on the chutes, links connecting the covers and the valves, sprocket drive-wheels, idler-wheels, guiding-curves for the conveyer, secondary outlets extending into the flue from the main water-supply pipe, and means for driving the conveyer.

Signed at New York, in the county of New York and State of New York, this 2d day of May, A. D. 1901.

GASTON A. BRONDER.

Witnesses:
   CHARLES J. GEFVERT,
   WILLIAM P. FRANCE.